(12) United States Patent
Iwamura et al.

(10) Patent No.: US 10,189,310 B2
(45) Date of Patent: Jan. 29, 2019

(54) AIRLESS TIRE

(71) Applicant: SUMITOMO RUBBER INDUSTRIES, LTD., Kobe-shi (JP)

(72) Inventors: Wako Iwamura, Kobe (JP); Makoto Sugiya, Kobe (JP); Katsumi Terakawa, Kobe (JP); Kazuyoshi Shiga, Kobe (JP)

(73) Assignee: SUMITOMO RUBBER INDUSTRIES, LTD., Kobe-shi (JP)

(*) Notice: Subject to any disclaimer, the term of this patent is extended or adjusted under 35 U.S.C. 154(b) by 116 days.

(21) Appl. No.: 15/332,173

(22) Filed: Oct. 24, 2016

(65) Prior Publication Data

US 2017/0113488 A1 Apr. 27, 2017

(30) Foreign Application Priority Data

Oct. 23, 2015 (JP) .................. 2015-209159

(51) Int. Cl.
*B60C 7/10* (2006.01)
*B60C 7/14* (2006.01)
(Continued)

(52) U.S. Cl.
CPC .............. *B60C 7/102* (2013.01); *B60C 1/00* (2013.01); *B60C 1/0016* (2013.01); *B60C 7/14* (2013.01);
(Continued)

(58) Field of Classification Search
CPC .. B60C 7/202; B60C 7/18; B60C 9/18; B60C 1/00; B60C 1/0016; B60C 7/14;
(Continued)

(56) References Cited

U.S. PATENT DOCUMENTS 5,379,819 A * 1/1995 Adachi .............. B60C 15/0036
152/542
7,201,194 B2 4/2007 Rhyne et al.
(Continued)

FOREIGN PATENT DOCUMENTS

JP 2014-218132 A 11/2014

OTHER PUBLICATIONS

Extended European Search Report dated Mar. 3, 2017 in Patent Application No. 16194670.2.

*Primary Examiner* — S. Joseph Morano
*Assistant Examiner* — Jean W Charleston
(74) *Attorney, Agent, or Firm* — Oblon, McClelland, Maier & Neustadt, L.L.P.

(57) ABSTRACT

An airless tire includes a tread ring, a hub and a spoke. The tread ring includes a tread rubber layer, a first reinforcing cord layer on radial direction inner side of the tread layer, a second reinforcing cord layer on radial direction inner side of the first cord layer, and a shear rubber layer between the cord layers, the cord layers have array layers including reinforcing cords, and topping rubber portions covering the array layers, each topping portion has an inner portion adjacent to the shear layer, and an outer portion, and the topping portion(s) has the inner portion formed of a composition including a rubber component which includes a butadiene rubber in content rate of 10 to 100% by mass, an α, β-unsaturated carboxylic acid metal salt in amount of 10 to 80 parts by weight with respect to 100 parts by mass of the component, and a peroxide.

20 Claims, 5 Drawing Sheets

(51) Int. Cl.
*B60C 1/00* (2006.01)
*C08L 7/00* (2006.01)
*C08K 5/098* (2006.01)
*B60C 9/18* (2006.01)
*B60C 7/18* (2006.01)

(52) U.S. Cl.
CPC ............... *B60C 7/18* (2013.01); *B60C 9/18* (2013.01); *C08K 5/098* (2013.01); *C08L 7/00* (2013.01); *B60C 2007/146* (2013.01); *B60C 2009/1871* (2013.01); *Y02T 10/862* (2013.01)

(58) Field of Classification Search
CPC ....... B60C 2009/1871; B60C 2007/146; C08L 7/00; Y02T 10/862
USPC ....... 152/246, 300, 310, 302, 303, 323, 325, 152/327, 328, 329
See application file for complete search history.

(56) References Cited

U.S. PATENT DOCUMENTS

| | | | |
|---|---|---|---|
| 8,080,603 B2 * | 12/2011 | Bergman | B60C 1/0016 524/394 |
| 9,346,317 B2 * | 5/2016 | Dotson | B29D 30/02 |
| 2004/0187996 A1 * | 9/2004 | Grah | B60C 1/00 152/516 |

* cited by examiner

AIRLESS TIRE

CROSS-REFERENCE TO RELATED APPLICATIONS

The present application is based upon and claims the benefit of priority to Japanese Patent Application No. 2015-209159, filed Oct. 23, 2015, the entire contents of which are incorporated herein by reference.

BACKGROUND OF THE INVENTION

Field of the Invention

The present invention relates to an airless tire that allows a rolling resistance to be reduced.

Description of Background Art

An airless tire may have a structure in which a cylindrical tread ring that has a ground contact surface and a hub that is fixed to an axle are connected by a spoke that has multiple spoke plates that are radially arrayed (for example, see Japanese Patent Laid-Open Publication No. 2014-218132). The entire contents of this publication are incorporated herein by reference.

SUMMARY OF THE INVENTION

According to one aspect of the present invention, an airless tire includes a tread ring having a cylindrical form and a ground contact surface, a hub positioned on a radial direction inner side of the tread ring and formed to be fixed to an axle, and a spoke structure connecting the tread ring and the hub. The tread ring includes a tread rubber layer, a first reinforcing cord layer, a second reinforcing cord layer and a shear rubber layer such that the tread rubber layer has the ground contact surface, the first reinforcing cord layer is positioned on a radial direction inner side of the tread rubber layer, the second reinforcing cord layer is positioned on a radial direction inner side of the first reinforcing cord layer, and the shear rubber layer is positioned between the first reinforcing cord layer and the second reinforcing cord layer, the first reinforcing cord layer has a first array layer including first reinforcing cords, and a first topping rubber portion covering the first array layer, the second reinforcing cord layer has a second array layer including second reinforcing cords, and a second topping rubber portion covering the second array layer, each of the first topping rubber portion and the second topping rubber portion has an inner topping rubber portion adjacent to the shear rubber layer, and an outer topping rubber portion, and the first topping rubber portion and/or the second topping rubber portion has the inner topping rubber portion formed of a rubber composition including a rubber component such that the rubber component includes a butadiene rubber in a content rate in a range of 10 to 100% by mass, an α,β-unsaturated carboxylic acid metal salt in an amount in a range of 10 to 80 parts by weight with respect to 100 parts by mass of the rubber component, and a peroxide.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
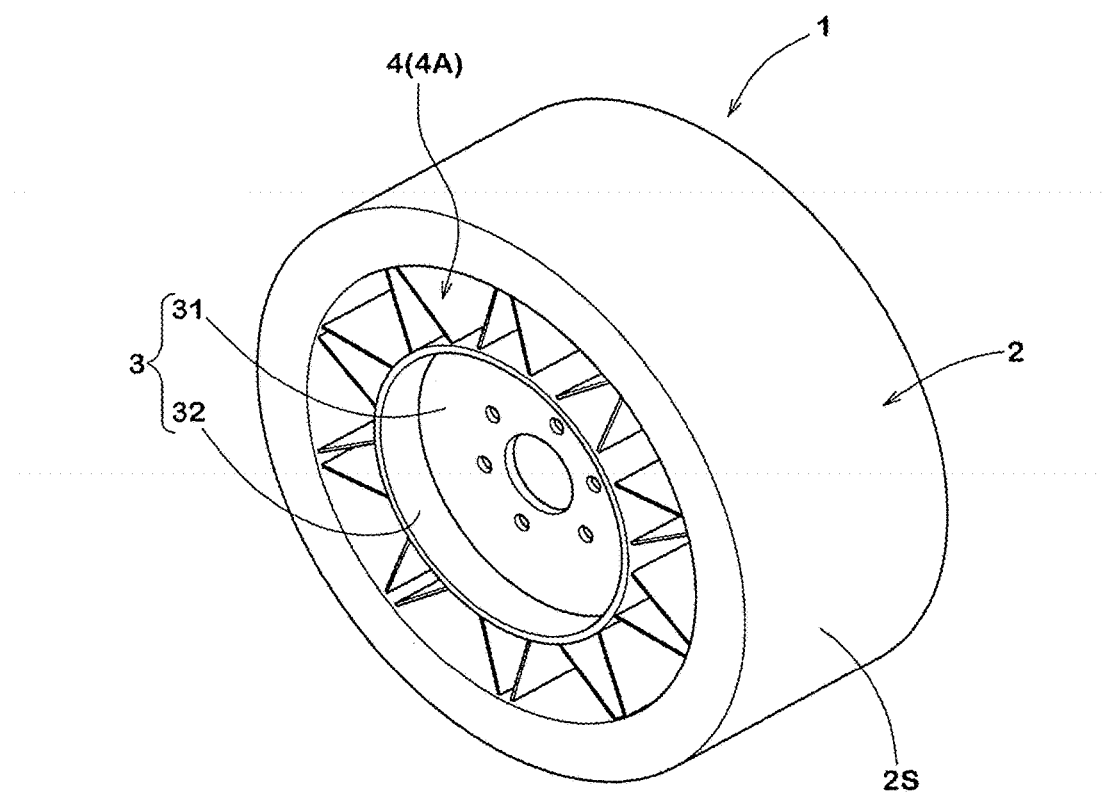
FIG. 1 is a perspective view illustrating an airless tire according to an embodiment of the present invention.

The embodiments will now be described with reference to the accompanying drawings, wherein like reference numerals designate corresponding or identical elements throughout the various drawings.

As illustrated in FIG. 1, an airless tire 1 according to an embodiment of the present invention includes a cylindrical tread ring 2 that has a ground contact surface (2S), a hub 3 that is positioned on a radial direction inner side of the tread ring 2 and is fixed to an axle, and a spoke 4 that connects the tread ring 2 and the hub 3. The present example illustrates a case where the airless tire 1 is formed as a passenger car tire.

The hub 3 corresponds to a tire wheel, and includes a disc-shaped disc part 31 and a cylindrical spoke attaching part 32, the disc part 31 being fixed to an axle, and the spoke attaching part 32 being formed on an outer periphery of the disc part 31. Similar to a conventional tire wheel, the hub 3 can be formed of a metal material such as steel, aluminum alloy or magnesium alloy.

The spoke 4 includes multiple spoke plates (4A) that each extend substantially radially and connect the tread ring 2 and the hub 3. The spoke 4 is integrally molded with the tread ring 2 and the hub 3 by cast molding using a polymer material. As the polymer material, a thermoplastic resin or a thermosetting resin can be adopted. However, from the point of view of safety, a thermosetting resin, such as an epoxy resin, a phenolic resin, a urethane resin, a silicone resin, a polyimide resin, or a melamine resin, is preferred. In particular, the urethane resin has excellent elastic properties and thus can be more preferably adopted.

Figure 2:
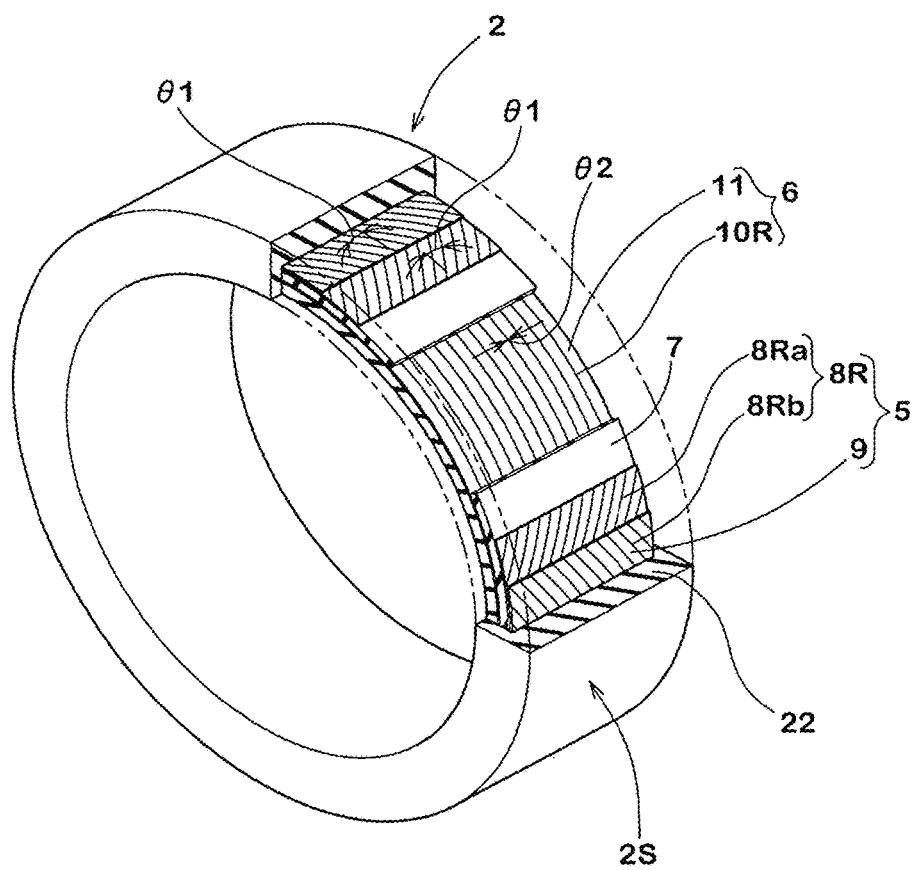
FIG. 2 is a perspective view illustrating a tread ring.
Figure 3:
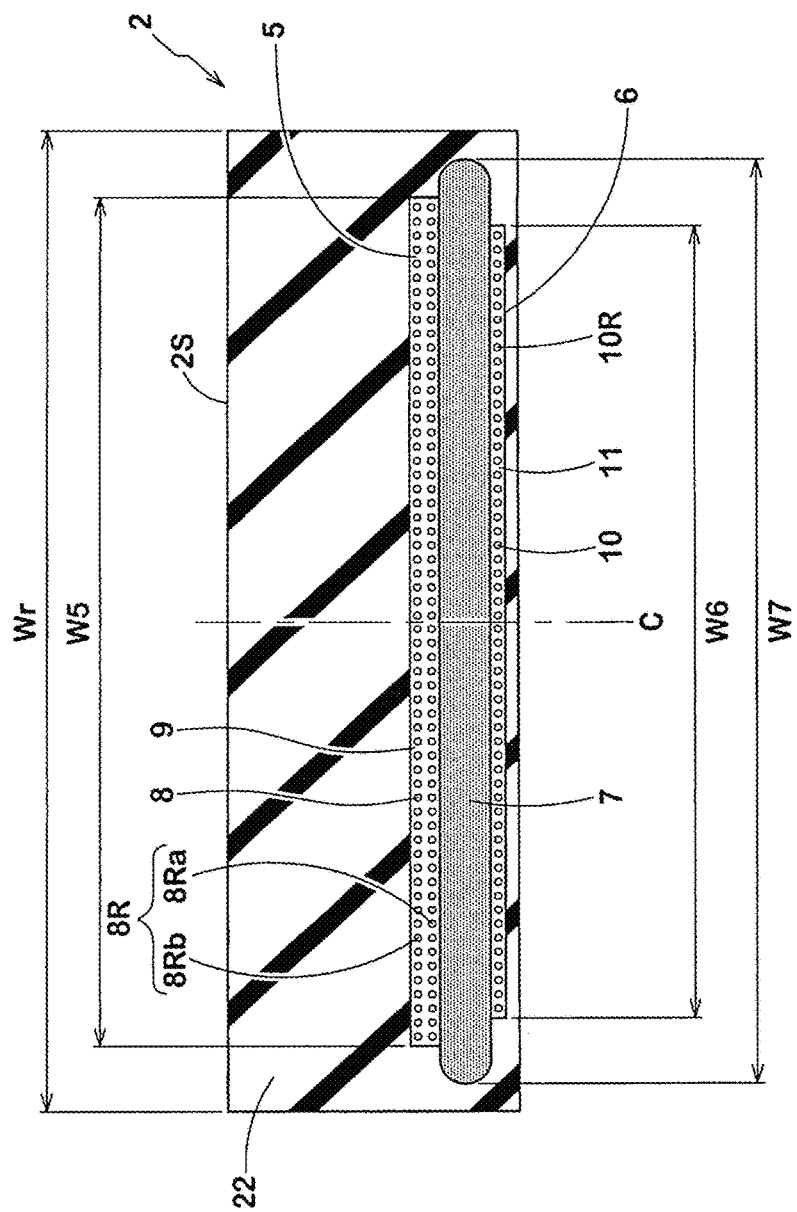
FIG. 3 is an enlarged partial cross-sectional view of the tread ring.

Next, as illustrated in FIGS. 2 and 3, the tread ring 2 includes a tread rubber layer 22 that forms the ground contact surface (2S), a first reinforcing cord layer 5 that is provided on a radial direction inner side of the tread rubber layer 22, a second reinforcing cord layer 6 that is provided on a tire radial direction inner side of the first reinforcing cord layer 5, and a shear rubber layer 7 that is provided between the first and second reinforcing cord layers (5, 6). That is, the tread ring 2 has a sandwich structure in which the shear rubber layer 7 is sandwiched by the first and second reinforcing cord layers (5, 6).

On the ground contact surface (2S), which is an outer peripheral surface of the tread rubber layer 22, tread grooves (not illustrated in the drawings) are formed in various pattern shapes in order to impart wet performance. Similar to a pneumatic tire, a rubber composition that is excellent in grip force against a road surface and excellent in wear resistance is preferably adopted for the tread rubber layer 22.

Figure 4:
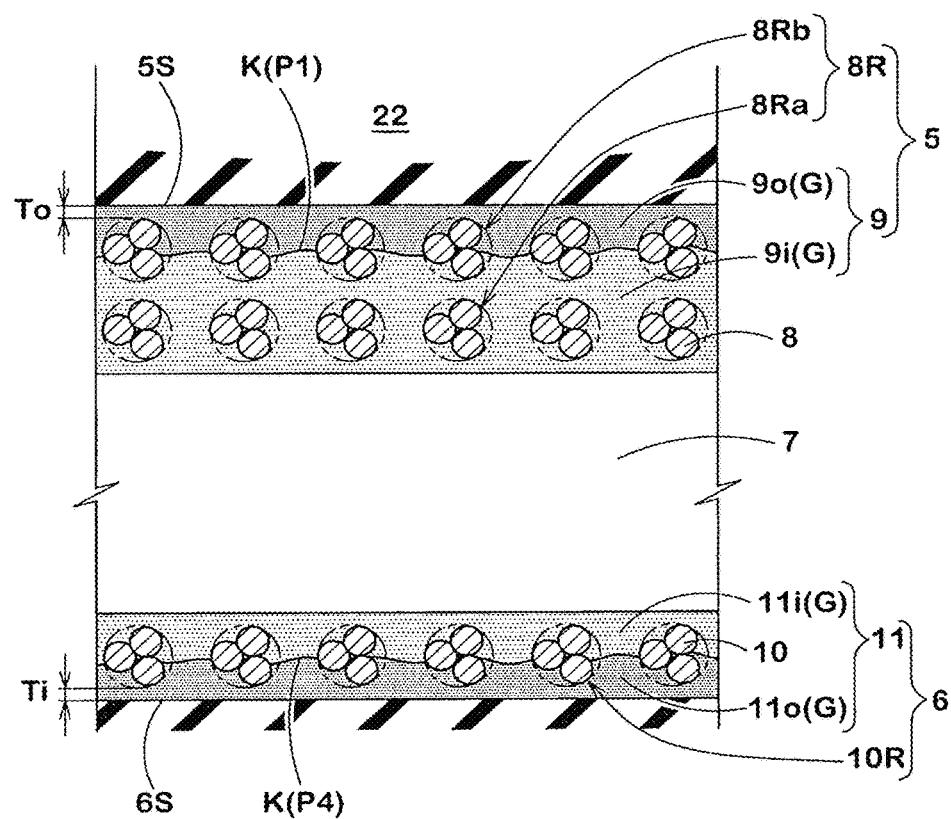
FIG. 4 is a further enlarged partial cross-sectional view illustrating a first and second reinforcing cord layers.

As illustrated in FIG. 4, the first reinforcing cord layer 5 includes an array layer (8R) of first reinforcing cords 8 and a first topping rubber part 9 that covers the array layer (8R). In the present example, the array layer (8R) is formed from multiple array layers, two array layers (8Ra, 8Rb) in the present example, that are formed on radial direction inner side and outer side. In the array layers (8Ra, 8Rb) of the present example, the first reinforcing cords 8 are bias-arrayed, for example, at an angle ($\theta 1$) (illustrated in FIG. 2) of 5-35 degrees with respect to a tire circumferential direction. Further, the first reinforcing cords 8 are arrayed at inclination orientations that are different between the array layers (8Ra, 8Rb) so that the first reinforcing cords 8 of different array layers cross each other. As a result, the first reinforcing cord layer 5 can increase an in-plane rigidity, and can improve turning performance by increasing a cornering power that is generated when a slip angle is applied.

The second reinforcing cord layer 6 includes an array layer (10R) of second reinforcing cords 10 and a second topping rubber part 11 that covers the array layer (10R). In the present example, the array layer (10R) is formed from one spirally formed array layer that is formed by spirally winding the second reinforcing cords 10, for example, at an angle ($\theta 2$) (illustrated in FIG. 2) of less than 5 degrees with respect to the tire circumferential direction. As a result, the second reinforcing cord layer 6, despite being formed from one array layer, can increase a tensile elastic force in the tire circumferential direction and suppress deformation of the tread ring 2. As the first and second reinforcing cords (8, 10), steel cords can be preferably adopted.

The array layer (10R) can also be formed from multiple spiral array layers. Further, similar to the array layer (8R) of the present example, the array layer (10R) can also be formed from multiple (for example, two) bias-arrayed array layers. Further, similar to the array layer (10R) of the present example, the array layer (8R) can also be formed from one or multiple spirally formed array layers. Further, at least one of the array layers (8R, 10R) can be formed from a combination of a bias-arrayed array layer and a spirally arrayed array layer. However, in the first and second reinforcing cord layers (5, 6), as in the present example, it is preferable that the first and second reinforcing cords (8, 10) be arrayed line-symmetric with respect to a tire equator (C). When there is no line symmetry, when a load is applied, twisting occurs in the first and second reinforcing cords (8, 10) and the tread ring 2 deforms, and thus, smooth rolling becomes difficult.

In an embodiment of the present invention, when the first topping rubber part 9 and the second topping rubber part 11 are respectively divided into inner topping rubber portions (9i, 11i), which are adjacent to the shear rubber layer 7, and remaining outer topping rubber portions (9o, 11o), at least one of the inner topping rubber portions (9i, 11i) is formed of a rubber composition (G) that satisfies the following condition (J). The present example illustrates a case where both the inner topping rubber portions (9i, 11i) are formed of the rubber composition (G). However, it is also possible that only one of the inner topping rubber portions (9i, 11i) is formed of the rubber composition (G).

Figure 5A:
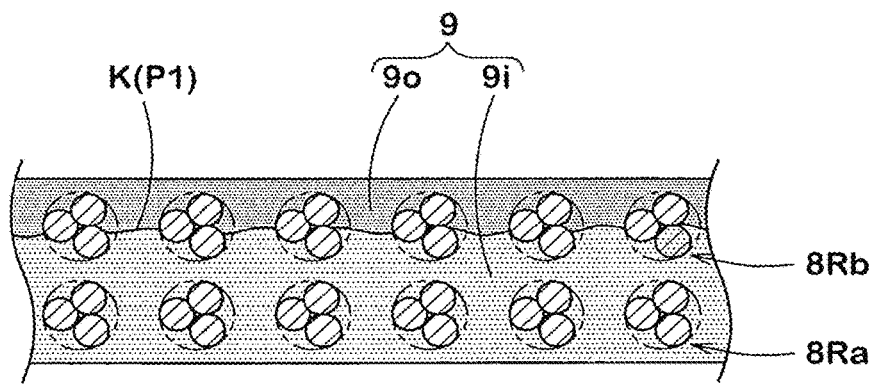
FIG. 5A-5C are cross-sectional views that each illustrates a division position between an inner topping rubber portion and an outer topping rubber portion.
Figure 5B:
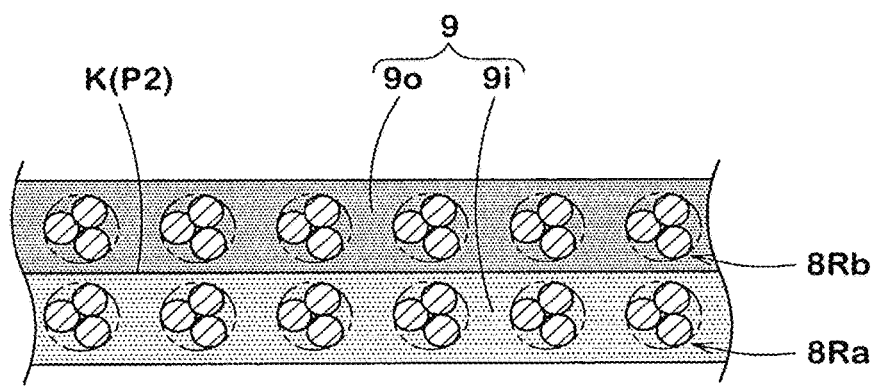
Figure 5C:
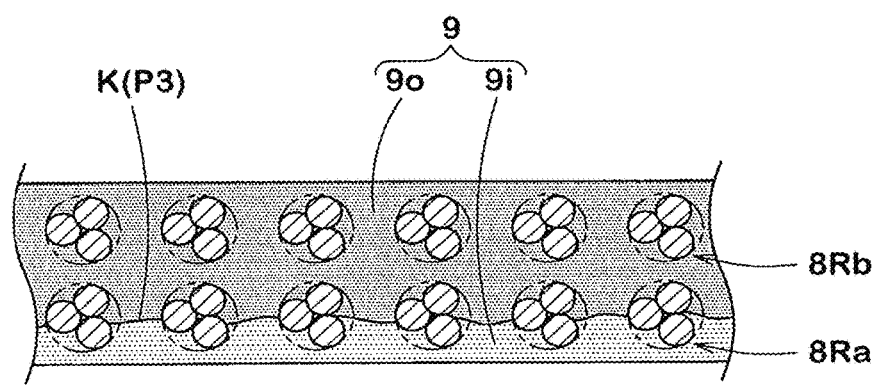

As illustrated in FIG. 5A-5C, a division position (K) between the inner topping rubber portion (9i) and the outer topping rubber portion (9o) can be suitably select from a position (P1) that intersects the array layer (8Rb) on a radial direction outer side, a position (P2) that is midway between the array layers (8Ra, 8Rb), a position (P3) that intersects the array layer (8Ra) on a radial direction inner side, and the like. As illustrated in FIG. 4, the present example illustrates a case where the division position (K) is the position (P1).

As illustrated in FIG. 4, in the case where the array layer (10R) is formed from one array layer, a division position (K) between the inner topping rubber portion (11i) and the outer topping rubber portion (11o) is a position (P4) that intersects the array layer (10R). However, similar to the first reinforcing cord layer 5, when the array layer (10R) is formed from multiple array layers, the division position (K) can be selected from positions corresponding to the above-described positions (P1-P3).

Next, the rubber composition (G) is described. Table 1 illustrates examples ((Example Ga-Gd) of compositions of the rubber composition (G). For reference, examples (Comparative Example Sa-Sc) of compositions of a sulfur vulcanized rubber (S) that is conventionally used in a pneumatic tire are also illustrated.

In Table 1, $E^*_{30}$ is a complex elastic modulus ($E^*$) (unit: MPa) at a temperature of 30° C., and $\tan \delta_{30}$ means a loss tangent ($\tan \delta_{30}$) at a temperature of 30° C. Values of both the complex elastic modulus ($E^*_{30}$) and the loss tangent ($\tan \delta_{30}$) are measured using a viscoelasticity spectrometer VES (Iwamoto Seisakusho Co., Ltd.) at a temperature of 30° C. under conditions of a frequency of 10 Hz, an initial strain of 10% and a dynamic strain of ±1%.

TABLE 1

| Rubber Composition | Comparative Examples (Sulfur Vulcanized Rubber (S)) | | | Examples (Rubber Composition (G)) | | | |
|---|---|---|---|---|---|---|---|
| | Sa | Sb | Sc | Ga | Gb | Gc | Gd |
| Natural Rubber (NR) | 80 | 100 | 0 | 80 | 0 | 0 | 0 |
| Butadiene Rubber (BR) | 20 | 0 | 100 | 20 | 100 | 100 | 100 |
| Carbon Black | 40 | 0 | 0 | 0 | 0 | 0 | |
| α, β-Unsaturated Carboxylic Acid Metal Salt (Zinc Acrylate) | 0 | 40 | 5 | 40 | 10 | 40 | 80 |
| Peroxide | 0 | 1 | 1 | 1 | 1 | 1 | 1 |
| Zinc Oxide | 5 | 0 | 0 | 0 | 0 | 0 | 0 |
| Sulfur | 2 | 0 | 0 | 0 | 0 | 0 | 0 |
| Vulcanization Accelerator | 1.6 | 0 | 0 | 0 | 0 | 0 | 0 |
| Ratio $E^*_{30}/\tan\delta_{30}$ | 200 | 400 | 330 | 750 | 1600 | 3000 | 4000 |
| $E^*_{30}$ (MPa) | 31 | 42 | 22 | 80 | 79 | 150 | 220 |

The rubber composition (G) satisfies the condition (J) that 10-80 parts by weight of an α,β-unsaturated carboxylic acid metal salt is contained with respect to 100 parts by mass of a rubber component, in which a content rate of a butadiene rubber (BR) is 10-100% by mass, and a peroxide is contained. In the rubber composition (G), the butadiene rubber (BR) and the α,β-unsaturated carboxylic acid metal salt co-cross-link with each other with the peroxide as an initiator, and thereby, high elasticity and low heat generation, which are difficult to achieve in a sulfur vulcanized rubber material, are achieved.

Therefore, by using the rubber composition (G) for at least one of the inner topping rubber portions (9i, 11i), an overall load bearing capacity of the tread ring 2 can be further increased. As a result, steering stability can be improved and a rolling resistance can be reduced. From such a point of view, it is preferable that the rubber composition (G) be used for both of the inner topping rubber portions (9i, 11i).

As compared to a rubber member (sulfur vulcanized rubber) that is used in a conventional pneumatic tire, the rubber composition (G) is poor in extensibility and has a tendency to easily break when subjected to large deformation. However, by using the rubber composition (G) for the topping rubber parts, rubber deformation can be kept low by the reinforcing cords (8, 10) and thus, breakdown can be suppressed and durability can be ensured.

The rubber component contains 10-100% by mass of the butadiene rubber (BR) in the 100 parts by mass. When the butadiene rubber (BR) is used by being blended with another rubber, examples of the rubber for the blending include a natural rubber (NR), a styrene butadiene rubber (SBR), an isoprene rubber (IR), a chloroprene rubber (CR), a styrene isoprene butadiene rubber (SIBR), a styrene-isoprene rubber (SIR), an epoxidized natural rubber (ENR), and the like. These rubbers can be used either individually or in combination of two or more. Among these rubbers, the natural rubber (NR) is preferable for being excellent in low heat generation.

The content rate of the butadiene rubber (BR) is 10% or more by weight, and is preferably 20% or more by weight. When the content rate of the butadiene rubber (BR) is below 10% by weight, there is a tendency that an effect of achieving low heat generation is reduced. Further, when the content rate of the butadiene rubber (BR) is 100% by weight, there is a tendency that strength is reduced. Therefore, an upper limit of the content rate of the butadiene rubber (BR) is preferably 90% or less by weight, and more preferably 80% or less by weight.

As a co-cross-linking agent, the $\alpha,\beta$-unsaturated carboxylic acid metal salt is adopted, which is a metal salt of an $\alpha,\beta$-unsaturated carboxylic acid such as an acrylic acid, a methacrylic acid, a maleic acid, a fumaric acid, or an itaconic acid. In particular, being excellent in durability, the acrylic acid metal salt and/or the methacrylic acid metal salt are preferred, and the methacrylic acid metal salt is more preferred. Further, examples of the metal in the $\alpha,\beta$-unsaturated carboxylic acid metal salt include zinc, sodium, magnesium, calcium, aluminum and the like. For allowing sufficient hardness to be obtained, zinc is preferred.

The content of the co-cross-linking agent $\alpha,\beta$-unsaturated carboxylic acid metal salt) is 10-80 parts by weight with respect to 100 parts by weight of the rubber component. When the content of the $\alpha,\beta$-unsaturated carboxylic acid metal salt is below 10 parts by weight, a sufficient cross-link density cannot be obtained. Further, when the content of the $\alpha,\beta$-unsaturated carboxylic acid metal salt exceeds 80 parts by weight, the rubber composition (G) becomes too hard and the strength also decreases. From such a viewpoint, a lower limit of the content of the $\alpha,\beta$-unsaturated carboxylic acid metal salt is preferably 12 parts or more by weight, and an upper limit of the content of the $\alpha,\beta$-unsaturated carboxylic acid metal salt is preferably 50 parts or less by weight and more preferably 35 parts or less by weight.

Examples of the peroxide include, for example, a benzoyl peroxide, a dicumyl peroxide, a di-t-butyl peroxide, a t-butyl cumyl peroxide, a methyl ethyl ketone peroxide, a cumene hydroperoxide, a 2,5-dimethyl-2,5-di(t-butylperoxy) hexane, a 2,5-dimethyl-2,5-di(benzoylperoxy)hexane, a t-butyl peroxy benzene, a 2,4-dichlorobenzoyl peroxide, a 1,1-di-t-butylperoxy-3,3,5-trimethyl cyclohexane, an n-butyl-4,4-di-t-butylperoxy valerate and the like. These peroxides can be used individually or in combination of two or more. Among these, the dicumyl peroxide is preferable.

It is preferable that the content of the peroxide be 0.1-6.0 parts by weight with respect to 100 parts by weight of the rubber component. When the content of the peroxide is below 0.1 parts by weight, there is a tendency that a sufficient hardness cannot be obtained. Further, when the content of the peroxide exceeds 6.0 parts by weight, the cross-link density becomes too large and there is a tendency that the strength is reduced. From such a point of view, it is more preferable that a lower limit of the content of the peroxide be 0.2 parts or more by weight and an upper limit of the content of the peroxide be 2 parts or less by weight.

The rubber composition (G) may contain reinforcing filler. Examples of the reinforcing filler include carbon black, silica, calcium carbonate, clay, talc, alumina, aluminum hydroxide, and the like. However, carbon black is particularly preferred. When the reinforcing filler is contained, a content of the reinforcing filler is preferably 90 parts or less by weight and more preferably 50 parts or less by weight with respect to 100 parts by weight of the rubber component. When the content of the reinforcing filler exceeds 90 parts by weight, there is risk that excellent low heat generation cannot be achieved.

In addition to the rubber component, the co-cross-linking agent $\alpha,\beta$-unsaturated carboxylic acid metal salt), the peroxide and the reinforcing filler, the rubber composition (G) may also contain compounding agents that are used in the tire industry, such as a zinc oxide, wax, a stearic acid, oil, an anti-aging agent, and a vulcanization accelerator, within ranges such that the effect according to an embodiment of the present invention is not impaired.

The rubber composition (G) contains the co-cross-linking agent $\alpha,\beta$-unsaturated carboxylic acid metal salt), and thus does not contain a vulcanizing agent such as sulfur or a sulfur compound.

Further, in the tread ring 2, it is desirable that the rubber composition (G) be used for at least one of the outer topping rubber portions (9o, 11o) and preferably for both of the outer topping rubber portions (9o, 11o). As a result, the load bearing capacity can be further increased, and the rolling resistance can be reduced while the steering stability is improved.

In the first topping rubber part 9, the rubber composition (G) that is used for the inner topping rubber portion (9i) (referred to as the rubber composition (G9i) for convenience) and the rubber composition (G) that is used for the outer topping rubber portion (9o) (referred to as the rubber composition (G9o) for convenience) may be different in composition as long as they at least satisfy the condition (J). However, from a point of view of productivity and prevention of peeling at the division position (K), it is preferable that the rubber composition (G9i) and the rubber composition (G9o) be the same rubber composition.

Similarly, in the second topping rubber part 11, the rubber composition (G) that is used for the inner topping rubber portion (11i) (referred to as the rubber composition (G11i) for convenience) and the rubber composition (G) that is used for the outer topping rubber portion (11o) (referred to as the rubber composition (G11o) for convenience) may be different in composition as long as they at least satisfy the condition (J). However, from a point of view of productivity and prevention of peeling at the division position (K), it is preferable that the rubber composition (G11i) and the rubber composition (G11o) be the same rubber composition.

In particular, it is more preferable that the rubber composition (G9i), the rubber composition (G9o), the rubber composition (G11i) and the rubber composition (G11o) be the same rubber composition.

When the tire deforms, expansion and contraction deformation becomes large on a radial direction outer surface (5S) of the first reinforcing cord layer 5 and on a radial direction inner surface (6S) of the second reinforcing cord layer 6. As a result, when the rubber composition (G) is used for the outer topping rubber portions (9o, 11o), there is a tendency that the rubber composition (G) causes damage at the outer surface (5S) and the inner surface (6S). Therefore, as illustrated in FIG. 4, in the first reinforcing cord layer 5, it is preferable that a coating thickness (To), by which the outer topping rubber portion (9o) protrudes to a radial direction outer side from an outer surface of radial direction outermost first reinforcing cords 8, be 2.0 mm or less. Further, similarly, in the second reinforcing cord layer 6, it is preferable that a coating thickness (Ti), by which the outer topping rubber portion (11o) protrudes to a radial direction inner side from an outer surface of radial direction innermost second reinforcing cords 11, be 2.0 mm or less. In this way, by regulating the coating thicknesses (To, Ti) to reduce expansion and contraction amounts of the outer surface (5S) and the inner surface (6S), damage to the rubber composition (G) can be suppressed.

Further, in the array layer (8R) of the first reinforcing cords 8 and the array layer (10R) of the second reinforcing cords 10, in a width direction cross section perpendicular to a cord length direction, it is preferable that a sum of cross-sectional areas of reinforcing words (8, 10) contained in a width of 5 cm be 2-100 mm². When the sum of the cross-sectional areas is less than 2 mm², a deformation amount of the tread ring 2 increases due to lack of rigidity, causing a decrease in durability. On the other hand, when the sum of the cross-sectional areas exceeds 100 mm², it causes a decrease in riding comfort. From this point of view, it is more preferable that the sum of the cross-sectional areas be 5 mm² or more and 70 mm² or less. When an array layer includes multiple layers, in each of the layers, a sum of cross-sectional areas of reinforcing cords is 2-100 mm².

Further, in order to suppress the deformation amount of the tread ring 2, it is preferable that the shear rubber layer 7 have high shear modulus. Therefore, in the present example, the rubber composition (G) is used also for the shear rubber layer 7. The rubber composition (G) that is used for the shear rubber layer 7 (referred to as the rubber composition (G7) for convenience) and the rubber compositions (G) that are used for the inner topping rubber portions (9i, 11i) (referred to as the rubber compositions (G9i, G11i) for convenience) may be different in composition as long as they at least satisfy the condition (J). However, from a point of view of preventing peeling of the shear rubber layer 7 from the inner topping rubber portions (9i, 11i), it is preferable that the rubber composition (G7) and the rubber compositions (G9i, G11i) be the same rubber composition.

As illustrated in FIG. 3, it is preferable that a tire axial direction width (W7) of the shear rubber layer 7 be 0.6-0.99 times a tire axial direction width (Wr) of the tread ring 2, and tire axial direction widths (W5, W6) of the first and second reinforcing cord layers (5, 6) be each 0.6-0.99 times the width (Wr).

In the tread ring 2, the load bearing capacity is achieved by the sandwich structure of the first and second reinforcing cord layers (5, 6) and the shear rubber layer 7. Therefore, the width (W7) of the shear rubber layer 7 and the widths (W5, W6) of the first and second reinforcing cord layers (5, 6) are each sufficiently wide with respect to the width (Wr) of the tread ring 2. When the width (W7) and the widths (W5, W6) are each below 0.6 times the width (Wr), a sufficient load bearing capacity cannot be achieved. On the other hand, when the width (W7) and the widths (W5, W6) each exceed 0.99 times the width (Wr), outer edges of the first and second reinforcing cord layers (5, 6) and the shear rubber layer 7 are likely to be exposed from a side surface side of the tread ring 2, and thus there is a risk that a damage such as peeling may occur with an exposed portion of the first and second reinforcing cord layers (5, 6) and the shear rubber layer 7 as a starting point.

In order to achieve a load bearing capacity by the sandwich structure, it is preferable that the width (W7) and the widths (W5, W6) be substantially equal to each other. Therefore, it is preferable that a ratio (Wmax/Wmin) of a maximum value (Wmax) to a minimum value (Wmin) among the width (W7) and the widths (W5, W6) be 1.1 or less.

In the above, an embodiment of the present invention is described in detail. However, the present invention is not limited to the illustrated embodiment and can be embodied in various modified modes.

EXAMPLES

Airless tires (tires corresponding to a tire size of 145/70R12) that each form the basic structure of FIG. 1 are prototyped, and rolling resistance performance, riding comfort and durability are tested. All the tires are prototyped according to the same specification except for the tread ring. The spoke is integrally molded with the tread ring and the hub using a cast molding method using a urethane resin (thermosetting resin). The first and second reinforcing cord layers (5, 6) are as follows.

First Reinforcing Cord Layer

Number of Plies: 2
Reinforcing Cords: Steel Cords
Angles of Cords: +21 degrees, −21 degrees
Second Reinforcing Cord Layer
Number of Plies: 1
Reinforcing Cords: Steel Cords
Angle of Cords: 0 degree (Spiral Winding)
Shear Rubber Layer
Thickness: 4 mm
Rolling Resistance Performance
A rolling resistance coefficient ((rolling resistance)/load× $10^4$) that is measured using a rolling resistance testing machine under a condition in which a speed is 40 km/h and a load is 1.17 kN is displayed. A smaller value indicates better rolling resistance performance.
Riding Comfort
Prototyped tires are mounted on four wheels of a vehicle (compact EV: product name: COMS). An unaccompanied driver drives the vehicle on a tire test course of a dry asphalt road surface. Sensory evaluation of riding comfort is conducted by the driver and the result is displayed as an index number with a result for Comparative Example 1 as 100. A larger index number indicates better riding comfort.
Durability
A drum testing machine is used, and each prototyped tire is run under a condition in which a speed is 100 km/h and a load is 1.5 kN. A mileage until damage occurs to the tread ring is displayed as an index number with a result for Comparative Example 1 as 100. A larger index number indicates better durability.

TABLE 2

|  | Comparative Example 1 | Comparative Example 2 | Example 1 | Example 2 | Example 3 | Example 4 | Example 5 | Example 6 | Example 7 | Example 8 |
|---|---|---|---|---|---|---|---|---|---|---|
| First Reinforcing Cord Layer | | | | | | | | | | |
| Inner Topping Rubber Portion | Sa | | | | | | Gc | | | |
| Outer Topping Rubber Portion | | Sa | | | | | | Gc | | |
| Division Position (K) | — | — | P1 | | | | — | | | |

TABLE 2-continued

| Second Reinforcing Cord Layer | | | | | | | | | | |
|---|---|---|---|---|---|---|---|---|---|---|
| Inner Topping Rubber Portion | | Sa | | | | | Gc | | | |
| Outer Topping Rubber Portion | | | Sa | | | | | Gc | | |
| Division Position (K) | | — | | P4 | | | — | | | |
| Shear Rubber Layer | | | Sa | | | | | Gc | | |
| Coating Thickness (To) <mm> | | | | | 0.3 | | | | | |
| Coating Thickness (Ti) <mm> | | | | | 0.3 | | | | | |
| Sum of Cross-Sectional Areas of Reinforcing Cords <mm²> | 8 | 80 | | | 8 | | | 80 | 100 | 120 |
| Rolling Resistance Performance | 150 | 130 | 105 | 100 | 99 | 98 | 90 | 80 | 88 | 85 |
| Riding Comfort | 100 | 80 | 100 | 100 | 100 | 100 | 100 | 80 | 75 | 60 |
| Durability | 100 | 100 | 100 | 100 | 100 | 100 | 100 | 150 | 160 | 170 |

|  | Example 9 | Example 10 | Example 11 | Example 12 | Example 13 | Example 14 | Example 15 |
|---|---|---|---|---|---|---|---|
| First Reinforcing Cord Layer | | | | | | | |
| Inner Topping Rubber Portion | | | | | Gc | | |
| Outer Topping Rubber Portion | | | | | Gc | | |
| Division Position (K) | | | | | — | | |
| Second Reinforcing Cord Layer | | | | | | | |
| Inner Topping Rubber Portion | | | | | Gc | | |
| Outer Topping Rubber Portion | | | | | Gc | | |
| Division Position (K) | | | | | — | | |
| Shear Rubber Layer | | | | | Gc | | |
| Coating Thickness (To) <mm> | | 0.3 | | 1.8 | 2 | 2.4 | 0.3 |
| Coating Thickness (Ti) <mm> | | 0.3 | | 1.8 | 2 | 2.4 | 0.3 |
| Sum of Cross-Sectional Areas of Reinforcing Cords <mm²> | 3 | 2 | 1 | | | 8 | |
| Rolling Resistance Performance | 95 | 90 | 80 | 110 | 115 | 118 | 95 |
| Riding Comfort | 110 | 120 | 130 | 100 | 100 | 100 | 100 |
| Durability | 95 | 90 | 80 | 90 | 80 | 50 | 100 |

As illustrated in Table 2, it can be confirmed that tires of the example allow a rolling resistance to be reduced while allowing a necessary durability to be ensured.

An airless tire may have a structure in which a cylindrical tread ring that has a ground contact surface and a hub that is fixed to an axle are connected by a spoke that has multiple spoke plates that are radially arrayed (for example, see Japanese Patent Laid-Open Publication No. 2014-218132).

In such an airless tire, for a tread rubber layer that forms the ground contact surface of the tread ring, using a conventional tread rubber material of a pneumatic tire is advantageous from a point of view of grip performance, wear resistance, and the like.

However, in a pneumatic tire, a load is supported by air that has a very small hysteresis loss, whereas in an airless tire, a load is supported by solid parts, specifically, the tread ring and the spoke plates, that have large hysteresis losses as compared to the air. Therefore, when a tread component that is used for a tread part of a pneumatic tire is used "as is" for a tread ring of an airless tire, a problem occurs that a rolling resistance of the airless tire deteriorates to about 2.5 times a rolling resistance of the pneumatic tire.

Therefore, in order to reduce the rolling resistance of an airless tire to the level of a pneumatic tire, a tread ring using a structure different from a tread structure in a pneumatic tire and using a member different in physical properties from a tread component in a pneumatic tire is formed.

An airless tire according to an embodiment of the present invention allows a rolling resistance to be reduced while ensuring excellent steering stability, based on adopting a sandwich structure for a tread ring in which a shear rubber layer is sandwiched by first and second reinforcing cord layers, and using a rubber composition that contains a butadiene rubber, an α,β-unsaturated carboxylic acid metal salt and a peroxide at predetermined rates for a topping rubber portion that is adjacent to the shear rubber layer in at least one of the first and second reinforcing cord layers.

An airless tire according to an embodiment of the present invention includes: a cylindrical tread ring that has a ground contact surface; a hub that is positioned on a radial direction inner side of the tread ring and is fixed to an axle; and a spoke that connects the tread ring and the hub. The tread ring includes: a tread rubber layer that has the ground contact surface; a first reinforcing cord layer that is provided on a radial direction inner side of the tread rubber layer; a second reinforcing cord layer that is provided on a radial direction inner side of the first reinforcing cord layer; and a shear rubber layer that is provided between the first reinforcing cord layer and the second reinforcing cord layer. The first reinforcing cord layer includes: an array layer of first reinforcing cords; and a first topping rubber part that covers the array layer. The second reinforcing cord layer includes: an array layer of second reinforcing cords; and a second topping rubber part that covers the array layer. When the first topping rubber part and the second topping rubber part are each divided into an inner topping rubber portion, which is adjacent to the shear rubber layer, and a remaining outer topping rubber portion, in at least one of the first topping rubber part and the second topping rubber part, the inner topping rubber portion is formed of a rubber composition that contains 10-80 parts by weight of an α,β-unsaturated carboxylic acid metal salt with respect to 100 parts by mass of a rubber component, in which a content rate of a butadiene rubber is 10-100% by mass, and contains a peroxide.

In an airless tire according to an embodiment of the present invention, it is preferable that, in each of the first topping rubber part and the second topping rubber part, the inner topping rubber portion be formed of a rubber composition that contains 10-80 parts by weight of an α,β-unsaturated carboxylic acid metal salt with respect to 100 parts by mass of a rubber component, in which a content rate of a butadiene rubber is 10-100% by mass, and contains a peroxide.

In an airless tire according to an embodiment of the present invention, it is preferable that, in at least one of the first topping rubber part and the second topping rubber part, the outer topping rubber portion be formed of a rubber composition that contains 10-80 parts by weight of an α,β-unsaturated carboxylic acid metal salt with respect to 100 parts by mass of a rubber component, in which a content rate of a butadiene rubber is 10-100% by mass, and contains a peroxide.

In an airless tire according to an embodiment of the present invention, it is preferable that, in each of the first topping rubber part and the second topping rubber part, the outer topping rubber portion be formed of a rubber composition that contains 10-80 parts by weight of an α,β-unsaturated carboxylic acid metal salt with respect to 100 parts by mass of a rubber component, in which a content rate of a butadiene rubber is 10-100% by mass, and contains a peroxide.

In an airless tire according to an embodiment of the present invention, it is preferable that, in each of the first topping rubber part and the second topping rubber part, the inner topping rubber portion be formed of the same rubber composition as the outer topping rubber portion.

In an airless tire according to an embodiment of the present invention, it is preferable that, in the first reinforcing cord layer, a coating thickness (To), by which the outer topping rubber portion protrudes to a radial direction outer side from an outer surface of the first reinforcing cords, be 2.0 mm or less.

In an airless tire according to an embodiment of the present invention, it is preferable that, in the second reinforcing cord layer, a coating thickness (Ti), by which the outer topping rubber portion protrudes to a radial direction inner side from an outer surface of the second reinforcing cords, be 2.0 mm or less.

In an airless tire according to an embodiment of the present invention, it is preferable that the shear rubber layer be formed of a rubber composition that contains 10-80 parts by weight of an α,β-unsaturated carboxylic acid metal salt with respect to 100 parts by mass of a rubber component, in which a content rate of a butadiene rubber is 10-100% by mass, and contains a peroxide.

In an airless tire according to an embodiment of the present invention, it is preferable that the inner topping rubber part be formed of the same rubber composition as the shear rubber layer.

In an airless tire according to an embodiment of the present invention, it is preferable that, in the array layer of the first reinforcing cords and the array layer of the second reinforcing cords, in a width direction cross section perpendicular to a cord length direction, a sum of cross-sectional areas of reinforcing cords contained in a width of 5 cm be 2-100 mm$^2$.

In an embodiment of the present invention, as described above, the sandwich structure is adopted for the tread ring in which the shear rubber layer is sandwiched by the first and second reinforcing cord layers. Therefore, a portion of a load that the tread ring receives during running of the tire can be supported by a tensile elastic force of the first and second reinforcing cord layers in a circumferential direction, and a deformation amount of the tread ring can be kept low.

In addition, in at least one, preferably both, of the first topping rubber part of the first reinforcing cord layer and the second topping rubber part of the second reinforcing cord layer, the rubber composition that contains a butadiene rubber, an α,β-unsaturated carboxylic acid metal salt and a peroxide at predetermined rates is used for the inner topping rubber portion that is adjacent to the shear rubber layer.

In the rubber composition, the butadiene rubber and the unsaturated carboxylic acid metal salt co-cross-link with each other with the peroxide as an initiator, and thereby, excellent physical properties including high elasticity and low fuel consumption can be obtained. As a result, a load bearing capacity of at least one, preferably both, of the first and second reinforcing cord layers can be further increased, and a rolling resistance can be reduced while excellent steering stability is ensured.

As compared to a rubber member (sulfur vulcanized rubber) that is used in a conventional pneumatic tire, the above-described rubber composition is poor in extensibility and has a tendency to easily break when subjected to large deformation. However, by using the rubber composition for the topping rubber parts, rubber deformation can be kept low by the reinforcing cords and thus, breakdown can be suppressed and necessary durability can be ensured.

Obviously, numerous modifications and variations of the present invention are possible in light of the above teachings. It is therefore to be understood that within the scope of the appended claims, the invention may be practiced otherwise than as specifically described herein.

What is claimed is:
1. An airless tire comprising:
a tread ring having a cylindrical form and a ground contact surface;
a hub positioned on a radial direction inner side of the tread ring and configured to be fixed to an axle; and
a spoke structure connecting the tread ring and the hub,
wherein the tread ring includes a tread rubber layer, a first reinforcing cord layer, a second reinforcing cord layer and a shear rubber layer such that the tread rubber layer has the ground contact surface, the first reinforcing cord layer is positioned on a radial direction inner side of the tread rubber layer, the second reinforcing cord layer is positioned on a radial direction inner side of the first reinforcing cord layer, and the shear rubber layer is positioned between the first reinforcing cord layer and the second reinforcing cord layer, the first reinforcing cord layer comprises a first array layer comprising a plurality of first reinforcing cords, and a first topping rubber portion covering the first array layer, the second reinforcing cord layer comprises a second array layer comprising a plurality of second reinforcing cords, and a second topping rubber portion covering the second array layer, each of the first topping rubber portion and the second topping rubber portion has an inner topping rubber portion adjacent to the shear rubber layer, and an outer topping rubber portion, and at least one of the first topping rubber portion and the second topping rubber portion has the inner topping rubber portion formed of a rubber composition comprising a rubber component such that the rubber component comprises a butadiene rubber in a content rate in a range of 10 to 100% by mass, an α,β-unsaturated carboxylic acid metal salt in an amount in a range of 10 to 80 parts by weight with respect to 100 parts by mass of the rubber component, and a peroxide.

2. The airless tire according to claim 1, wherein each of the first topping rubber portion and the second topping rubber portion has the inner topping rubber portion.

3. The airless tire according to claim 2, wherein at least one of the first topping rubber portion and the second topping rubber portion has the outer topping rubber portion formed of a rubber composition comprising a rubber component such that the rubber component comprises a butadiene rubber in a content rate in a range of 10 to 100% by mass, an α,β-unsaturated carboxylic acid metal salt in an amount in a range of 10 to 80 parts by weight of with respect to 100 parts by mass of the rubber component, and a peroxide.

4. The airless tire according to claim 3, wherein each of the first topping rubber portion and the second topping rubber portion has the outer topping rubber portion.

5. The airless tire according to claim 4, wherein each of the first topping rubber portion and the second topping rubber portion has the inner and outer topping rubber portions having the rubber compositions which have a same rubber composition.

6. The airless tire according to claim 5, wherein the first reinforcing cord layer has a coating thickness To, by which the outer topping rubber portion protrudes to a radial direction outer side from an outer surface of the first reinforcing cords, in a range of 2.0 mm or less.

7. The airless tire according to claim 2, wherein the shear rubber layer is formed of a rubber composition comprising a rubber component such that the rubber component comprises a butadiene rubber in a content rate in a range of 10 to 100% by mass, an α,β-unsaturated carboxylic acid metal salt in an amount in a range of 10 to 80 parts by weight with respect to 100 parts by mass of the rubber component, and a peroxide.

8. The airless tire according to claim 7, wherein the tread ring is formed such that the inner topping rubber portion and the shear rubber layer have the rubber compositions which have a same rubber composition.

9. The airless tire according to claim 2, wherein each of the array layer of the first reinforcing cords and the array layer of the second reinforcing cords has a sum of cross-sectional areas of reinforcing cords in a range of 2 to 100 mm$^2$ when the cross-sectional areas of the reinforcing cords are measured in a width of 5 cm in a width direction cross section perpendicular to a cord length direction.

10. The airless tire according to claim 3, wherein the shear rubber layer is formed of a rubber composition comprising a rubber component such that the rubber component comprises a butadiene rubber in a content rate in a range of 10 to 100% by mass, an α,β-unsaturated carboxylic acid metal salt in an amount in a range of 10 to 80 parts by weight with respect to 100 parts by mass of the rubber component, and a peroxide.

11. The airless tire according to claim 10, wherein the tread ring is formed such that the inner topping rubber portion and the shear rubber layer have the rubber compositions which have a same rubber composition.

12. The airless tire according to claim 3, wherein each of the array layer of the first reinforcing cords and the array layer of the second reinforcing cords has a sum of cross-sectional areas of reinforcing cords in a range of 2 to 100 mm$^2$ when the cross-sectional areas of the reinforcing cords are measured in a width of 5 cm in a width direction cross section perpendicular to a cord length direction.

13. The airless tire according to claim 3, wherein the shear rubber layer is formed of a rubber composition comprising a rubber component such that the rubber component comprises a butadiene rubber in a content rate in a range of 10 to 100% by mass, an α,β-unsaturated carboxylic acid metal salt in an amount in a range of 10 to 80 parts by weight with respect to 100 parts by mass of the rubber component, and a peroxide.

14. The airless tire according to claim 4, wherein the first reinforcing cord layer has a coating thickness To, by which the outer topping rubber portion protrudes to a radial direction outer side from an outer surface of the first reinforcing cords, in a range of 2.0 mm or less.

15. The airless tire according to claim 14, wherein the second reinforcing cord layer has a coating thickness Ti, by which the outer topping rubber portion protrudes to a radial direction inner side from an outer surface of the second reinforcing cords, in a range of 2.0 mm or less.

16. The airless tire according to claim 4, wherein the second reinforcing cord layer has a coating thickness Ti, by which the outer topping rubber portion protrudes to a radial direction inner side from an outer surface of the second reinforcing cords, in a range of 2.0 mm or less.

17. The airless tire according to claim 5, wherein the second reinforcing cord layer has a coating thickness Ti, by which the outer topping rubber portion protrudes to a radial direction inner side from an outer surface of the second reinforcing cords, in a range of 2.0 mm or less.

18. The airless tire according to claim 1, wherein the shear rubber layer is formed of a rubber composition comprising a rubber component such that the rubber component comprises a butadiene rubber in a content rate in a range of 10 to 100% by mass, an α-β-unsaturated carboxylic acid metal salt in an amount in a range of 10 to 80 parts by weight with respect to 100 parts by mass of the rubber component, and a peroxide.

19. The airless tire according to claim 18, wherein the tread ring is formed such that the inner topping rubber portion and the shear rubber layer have the rubber compositions which have a same rubber composition.

20. The airless tire according to claim 1, wherein each of the array layer of the first reinforcing cords and the array layer of the second reinforcing cords has a sum of cross-sectional areas of reinforcing cords in a range of 2 to 100 mm$^2$ when the cross-sectional areas of the reinforcing cords are measured in a width of 5 cm in a width direction cross section perpendicular to a cord length direction.

* * * * *